US009796531B2

(12) United States Patent
Ishibashi et al.

(10) Patent No.: US 9,796,531 B2
(45) Date of Patent: Oct. 24, 2017

(54) SLAT CONVEYOR

(71) Applicants: Masahiro Ishibashi, Osaka (JP); Takaharu Suzuki, Shiga (JP)

(72) Inventors: Masahiro Ishibashi, Osaka (JP); Takaharu Suzuki, Shiga (JP)

(73) Assignee: Daifuku Co., Ltd. (JP)

( * ) Notice: Subject to any disclaimer, the term of this patent is extended or adjusted under 35 U.S.C. 154(b) by 0 days.

(21) Appl. No.: 15/009,396

(22) Filed: Jan. 28, 2016

(65) Prior Publication Data

US 2016/0145048 A1 May 26, 2016

Related U.S. Application Data

(63) Continuation of application No. PCT/JP2014/070929, filed on Aug. 7, 2014.

(30) Foreign Application Priority Data

Oct. 8, 2013 (JP) ................................. 2013-210945

(51) Int. Cl.
*B65G 47/26* (2006.01)
*B65G 17/18* (2006.01)
*B65G 17/34* (2006.01)
*B65G 23/38* (2006.01)

(52) U.S. Cl.
CPC ............. *B65G 17/18* (2013.01); *B65G 17/34* (2013.01); *B65G 23/38* (2013.01)

(58) Field of Classification Search
CPC ......... B65G 17/16; B65G 17/18; B65G 17/34
USPC ................................................. 198/797–800
See application file for complete search history.

(56) References Cited

U.S. PATENT DOCUMENTS

| 1,531,847 | A | * | 3/1925 | Danforth | ............... | B65G 17/067 |
| | | | | | | 198/798 |
| 2,493,857 | A | * | 1/1950 | Cargill | ..................... | A21B 1/48 |
| | | | | | | 198/798 |
| 2,512,356 | A | * | 6/1950 | Massiello | ................ | A21B 1/48 |
| | | | | | | 198/798 |
| 2,856,081 | A | * | 10/1958 | Zaha | ....................... | E04H 6/187 |
| | | | | | | 198/798 |

(Continued)

FOREIGN PATENT DOCUMENTS

| JP | S532350 U | 1/1978 |
| JP | H03158310 A | 7/1991 |

*Primary Examiner* — William R Harp
(74) *Attorney, Agent, or Firm* — St. Onge Steward Johnston & Reens LLC

(57) ABSTRACT

A slat conveyor has a plurality of slat bodies supported between a pair of left and right driving endless turning bodies by concentric horizontal support shafts and has a pair of front and rear guide rollers supported to a guide rail laid on each of upper and lower horizontal path sections. A U-turn guiding mechanism at both ends includes the guide rollers, a slat body posture controlling rotating body, and a drive mechanism for the rotating body. The rotating body has the same turning radius as that of the horizontal support shaft on a U-turn path section, and includes an engaging portion for positioning and turning the guide rollers. The drive mechanism drives the rotating body such that the engaging portion is turned in the same direction and at the same speed as the turning speed of the horizontal support shaft on the U-turn path section.

4 Claims, 13 Drawing Sheets

(56) References Cited

U.S. PATENT DOCUMENTS

| | | | | |
|---|---|---|---|---|
| 2,893,538 | A | * | 7/1959 | Buttironi ................ B65G 35/08 198/795 |
| 3,243,032 | A | | 3/1966 | Chambon |
| 3,795,328 | A | * | 3/1974 | Buttironi ................ B65G 35/08 198/798 |
| 4,139,092 | A | | 2/1979 | Yamano |
| 5,060,779 | A | * | 10/1991 | Landaeus ............. B65G 17/123 198/321 |
| 7,344,015 | B2 | * | 3/2008 | Mustalahti ........... B65G 17/123 198/321 |
| 7,537,100 | B2 | * | 5/2009 | Mustalahti ............ B66B 23/147 198/321 |
| 9,010,525 | B2 | * | 4/2015 | Okazaki ............... B65G 17/067 198/475.1 |

* cited by examiner

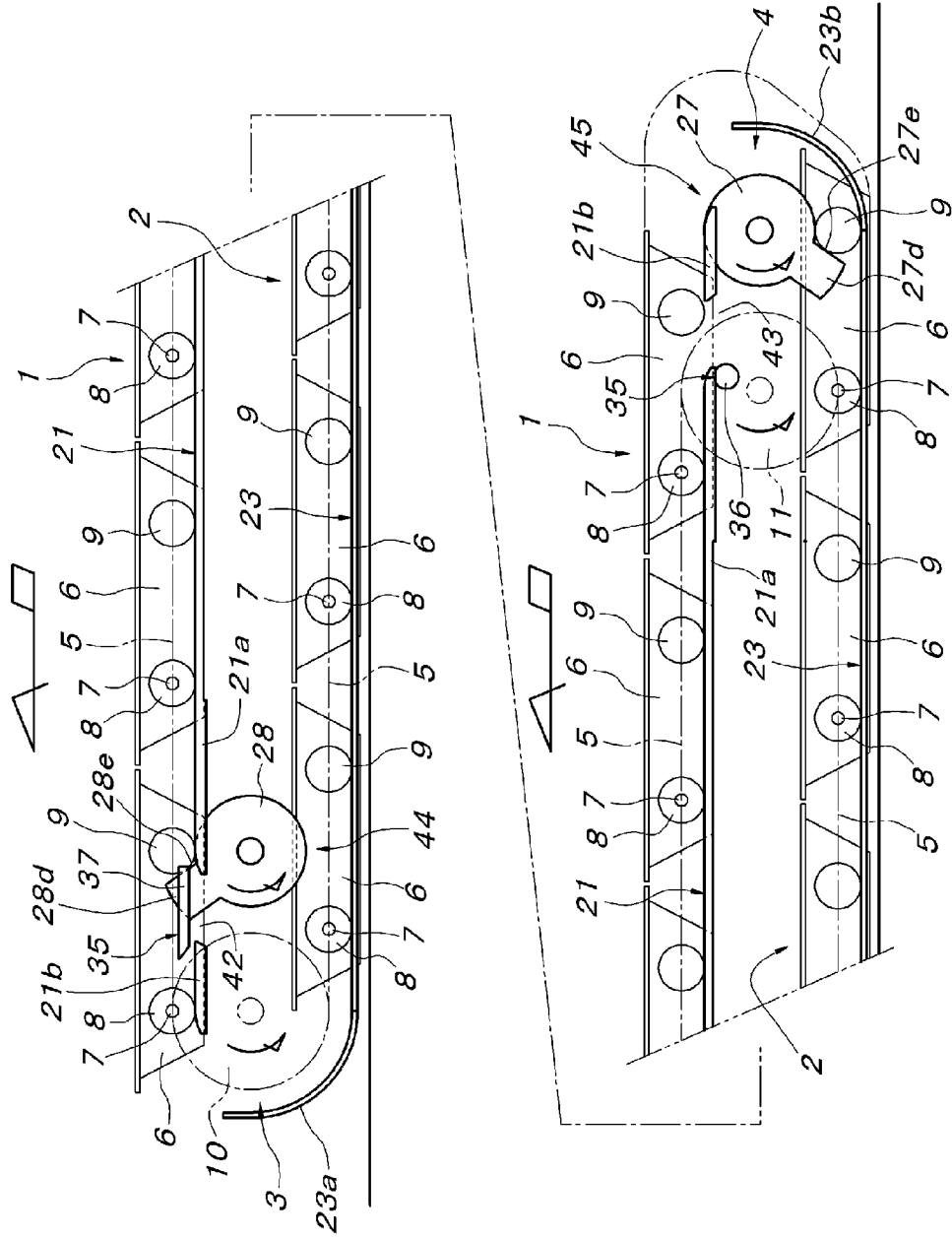

SLAT CONVEYOR

FIELD OF THE INVENTION

The present invention relates to a slat conveyor of a form in which slat bodies parallelly and horizontally circularly move while keeping load supporting postures in which the slat bodies always have their load supporting surfaces facing up.

BACKGROUND OF THE INVENTION

This kind of slat conveyor is one in which left and right both side faces of each slat body are pivotally supported, by horizontal support shafts, to a pair of left and right driving endless turning bodies turning along a circulation path composed of an upper horizontal outward path section, a lower horizontal inward path section, and U-turn path sections at both ends. In general, two forms of slat conveyor are known. The first form is one that positions of the pair of left and right driving endless turning bodies are shifted in the front-rear direction and pivotal support positions of the slat body with respect to the pair of left and right driving endless turning bodies are also shifted in the front-rear direction in conformity with the pair of left and right driving endless turning bodies. The second form is one that the pair of left and right driving endless turning bodies are disposed bilaterally symmetrically and each slat body is pivotally supported between the pair of left and right driving endless turning bodies by mutually concentric horizontal support shafts. The present invention relates to improvements of the latter second form of slat conveyor. As described in Patent Literature 1 (Japanese Unexamined Utility Model Application Publication No. S53-2350), a conventional slat conveyor of this kind has a configuration that the left and right both side faces of each slat body are provided with a third roller positioned outside the pair of left and right driving endless turning bodies in addition to a pair of front and rear guide rollers rolling along a guide rail disposed along each of the upper and lower horizontal path sections, and a slat body posture controlling rotating body interlockingly rotating with the driving endless turning bodies is pivotally supported outside the driving endless turning bodies on the U-turn path sections at both ends, and the third roller is engaged with the slat body posture controlling rotating body to make each slat body U-turn parallelly while being maintained in the horizontal posture on the U-turn path sections at both ends.

SUMMARY OF THE INVENTION

The slat conveyor described in the above Patent Literature 1 is of a configuration that the third roller engaged with the slat body posture controlling rotating body is required in addition to the pair of front and rear guide rollers as described above. Thus, the slat conveyor is configured such that an arm member vertically swinging integrally with the slat body is disposed outside the driving endless turning body via the horizontal support shaft for supporting the slat body to the driving endless turning body and the third roller is pivotally supported to a distal end of the arm member so as to be concentric with one of the pair of front and rear guide rollers. There are problems that not only is the configuration of a U-turn guiding means for making each slat body U-turn parallelly while being maintained in the horizontal posture on the U-turn path sections at both ends complicated but also the width of the entire slat conveyor is made larger.

Accordingly, the present invention proposes a slat conveyor capable of solving the foregoing conventional problems. Described by giving reference symbols in parentheses used in the description of embodiments described later in order to facilitate understanding the relationship with the embodiments, a slat conveyor according to a first embodiment of the present invention includes a pair of left and right driving endless turning bodies (5) turning along a circulation path composed of an upper horizontal outward path section (1), a lower horizontal inward path section (2), and U-turn path sections (3, 4) at both ends; a large number of slat bodies (6) circularly turning with their load supporting surfaces (6a) facing up on the upper and lower both path sections (1, 2), each slat body (6) having left and right both side faces pivotally supported vertically and swingably to the driving endless turning bodies (5) via mutually concentric horizontal support shafts (7), the left and right both side faces of the each slat body (6) provided with at least one guide roller (8, 9) pivotally supported at a position away in a front-rear direction from the horizontal support shaft (7) so as to be located between the driving endless turning bodies (5) and the slat body (6) in a plan view; the upper and lower both path sections (1, 2) provided with a guide rail (21, 23) holding the slat body (6) in a horizontal posture via the guide roller (8, 9); and the U-turn path sections (3, 4) at both ends provided with a U-turn guiding means (25, 26) for making the each slat body (6) U-turn parallelly while being maintained in the horizontal posture, wherein the U-turn guiding means (25, 26) is composed of the guide roller (8, 9), a slat body posture controlling rotating body (27, 28), and a drive means (30) for the rotating body (27, 28), and the rotating body (27, 28) has an engaging portion (27e, 28e) having the same turning radius as that of the horizontal support shaft (7) on the U-turn path sections (3, 4) and positioning and turning the guide roller (8, 9), and the drive means (30) drives the rotating body (27, 28) such that the engaging portion (27e, 28e) is turned in the same direction and at the same speed as a turning speed of the horizontal support shaft (7) on the U-turn path sections (3, 4).

In the case of implementing the above present invention, in a second embodiment, the guide roller (8, 9) can be pivotally supported in front-rear pairs at positions front-rear symmetric with respect to the horizontal support shaft (7) so as to be disposed in series in a slat body moving direction, and the slat body posture controlling rotating body (27, 28) of the U-turn guiding means (25, 26) can be shifted in the front and rear both directions with respect to a rotating wheel (10, 11) for making the driving endless turning bodies (5) U-turn and be pivotally supported so as to correspond to the pair of front and rear guide rollers (8, 9) respectively. In this case, in a third embodiment of the invention, the guide rail (21) holding the each slat body (6) in the horizontal posture on the upper horizontal outward path section (1) can be disposed below the guide rollers (8, 9) so as to rollably receive the guide rollers (8, 9), and the guide rail (21) can have an end region provided with a first notched portion (33) for allowing passage of one (9/8) of the pair of front and rear guide rollers (8, 9), which guide roller (9/8) crossing the guide rail (21) and making a U-turn movement, and a second notched portion (34) for allowing passage of the horizontal support shaft (7) crossing the guide rail (21) and making a U-turn movement, and an auxiliary guiding means (35) can be provided that prevents falling of the other guide roller (9/8) moving on these respective notched portions (33, 34).

Further, in this case, in a fourth embodiment, the auxiliary guiding means (35) can be composed of a supporting roller (36) pivotally supported at a fixed position so as to receive a bottom surface of the slat body (6), a supporting rail (37) supporting the driving endless turning body (5) of a region to which the horizontal support shaft (7) is coupled, and a hold-down rail (38) preventing lifting of the other guide roller (9/8).

In a fifth embodiment of the invention, a main guide roller (9) can be pivotally supported at a position away to either the front or rear side of the horizontal support shaft (7) and an auxiliary guide roller (8) pivotally supported concentrically with the horizontal support shaft (7) can be provided as the guide roller, and the slat body posture controlling rotating body (27, 28) of the U-turn guiding means (44, 45) can be provided correspondingly to the main guide roller (9). In this case, in a sixth embodiment, the guide rail (21) holding the each slat body (6) in the horizontal posture on the upper horizontal outward path section (1) can be disposed below the main and auxiliary both guide rollers (8, 9) so as to rollably receive the main and auxiliary both guide rollers (8, 9), and the guide rail (21) can have an end region provided with a notched portion (42/43) for allowing the guide roller (9/8) to cross the guide rail (21) and make a U-turn movement, which guide roller (9/8) located on the inner side of the main and auxiliary both guide rollers (8, 9), and an auxiliary guiding means (35) can be provided that prevents falling of the outer guide roller (8/9) passing through and moving on the notched portion (42/43). Further, in this case, in a seventh embodiment, the auxiliary guiding means (35) can be composed of a supporting roller (36) pivotally supported at a fixed position so as to receive a bottom surface of the slat body (6) and a supporting rail (37) supporting the driving endless turning body (5) of a region to which the horizontal support shaft (7) is coupled.

In an eighth embodiment of the invention, the slat body posture controlling rotating body (27, 28) can be composed of a circular plate (27c, 28c) having a circumferential surface along an inner edge of a U-turn movement track of the guide roller (8, 9), and a protruding arm (27d, 28d) protruded from the circular plate (27c, 28c) in a radial direction, and an internal corner portion between one side of the protruding arm (27d, 28d) and the circumferential surface of the circular plate (27c, 28c) can constitute the engaging portion (27e, 28e) for positioning the guide roller (8, 9).

With the configuration of the first embodiment of the present invention, on the U-turn path sections at both ends, the U-turn guiding means necessary for making each slat body U-turn parallelly while being maintained in the horizontal posture utilizes directly the guide roller always provided to the left and right both side faces of each slat body, that is, the guide roller guided by the guide rail laid for holding the slat body in the horizontal posture on each of the upper and lower horizontal path sections, and positions this guide roller by the engaging portion provided on the outer circumference of the slat body posture controlling rotating body, and turns the guide roller so as to keep constant its relative position with respect to the horizontal support shaft turning the U-turn path sections. Thus, not only does the U-turn guiding means have a simple configuration as compared to the conventional U-turn guiding means requiring the third roller in addition to the above guide roller, but also the width of the entire slat conveyor can be narrowed since the moving path of the guide roller overlapped with the arrangement space of the slat body posture controlling rotating body and the turning path of the driving endless turning body only need to be secured at the left and right both sides of the slat body and the need for the arrangement space of the slat body posture controlling rotating body overlapped with the turning path of the third roller to be secured further outside of the turning path of the driving endless turning body as in the conventional manner is eliminated.

In the case where the turning direction of the slat body is fixed to a single direction, the configuration of the fifth embodiment can be adopted to reduce the number of components, and the configuration can be further simplified. When the configuration of the second embodiment is adopted, however, the structures of the U-turn path sections at both ends respectively provided with the U-turn guiding means become symmetric, and thus, it becomes possible to switch the turning direction of the slat body between the normal and reverse directions and use the slat body.

According to the configuration of the third or fourth embodiments or the sixth and seventh embodiments, any interference of the guide roller and horizontal support shaft making U-turn movements with the guide rail can be avoided by the notched portion provided to the guide rail and simultaneously the problem that the slat body is accidentally tilted can be solved by the notched portion provided to the guide rail, adopting the configuration that each slat body moving on the upper horizontal outward path section is supported by the guide rail from below via the guide roller.

Further, with the configuration of the eighth embodiment, the slat body posture controlling rotating body can be implemented easily and inexpensively as compared to the one having a configuration that a recessed portion to which the guide roller is freely fitted is formed on the outer circumference of the circular plate.

BRIEF DESCRIPTION OF THE DRAWINGS

FIG. 18 is a side view in which an intermediate part of a slat conveyor in another embodiment is omitted.

DETAILED DESCRIPTION OF THE INVENTION

Figure 1:
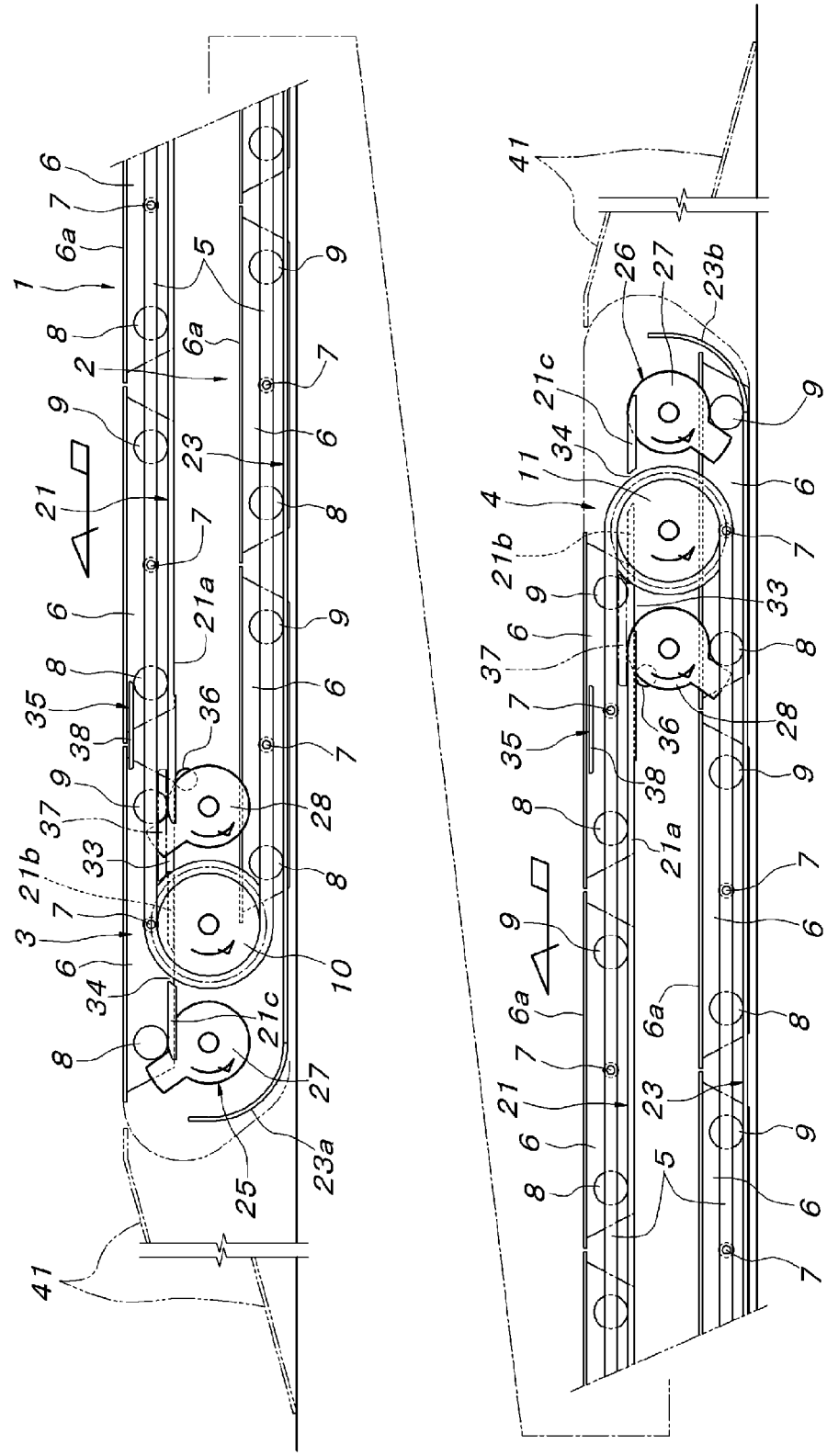
FIG. 1 is a side view in which an intermediate part of a slat conveyor is omitted.

A structure of one embodiment of the present invention will be described based on FIGS. 1 to 13. A slat conveyor illustrated is provided with a pair of left and right driving endless turning bodies 5 and a large number of slat bodies 6 circularly turning with load supporting surfaces 6a facing up on the upper and lower both horizontal path sections 1, 2. The pair of left and right driving endless turning bodies 5 turn along a circulation path composed of the upper horizontal outward path section 1, the lower horizontal inward path section 2, and U-turn path sections 3, 4 at both ends. Each slat body 6 has a horizontally long rectangular shape in a plan view and is configured to have a hollow box-shaped structure with an inverted trapezoidal shape in a longitudinal section along the moving direction in order to enhance its rigidity. To left and right both side faces of each slat body 6, a horizontal support shaft 7 is protrudingly provided concentrically with each other at a central position of the length in the moving direction of the slat body 6, and a guide roller 8, 9 freely rotatable about a horizontal axis at the same level as the horizontal support shaft 7 is pivotally supported at two places front-rear symmetric with respect to the horizontal support shaft 7.

Figure 2:
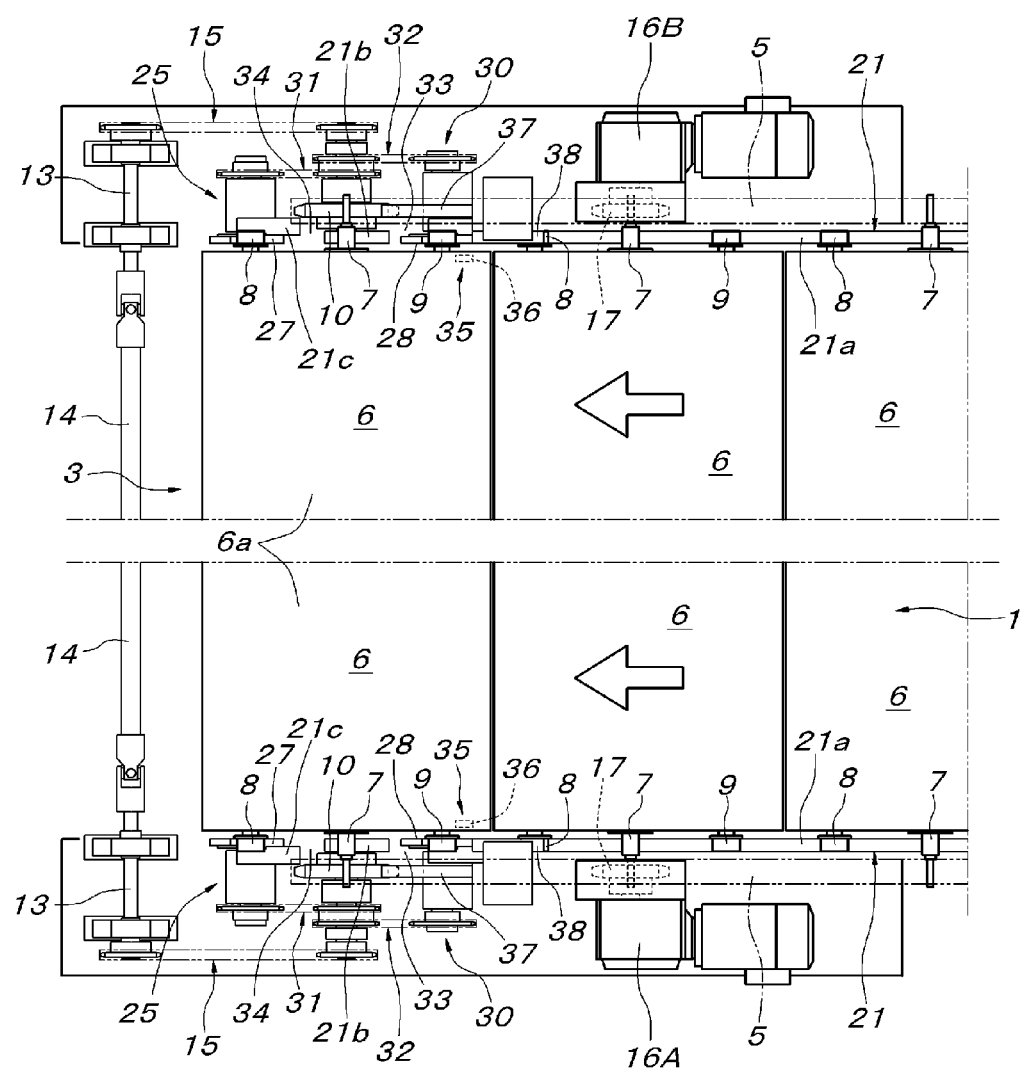
FIG. 2 is a partially omitted plan view illustrating a conveyance path terminal end portion of the slat conveyor.
Figure 4:
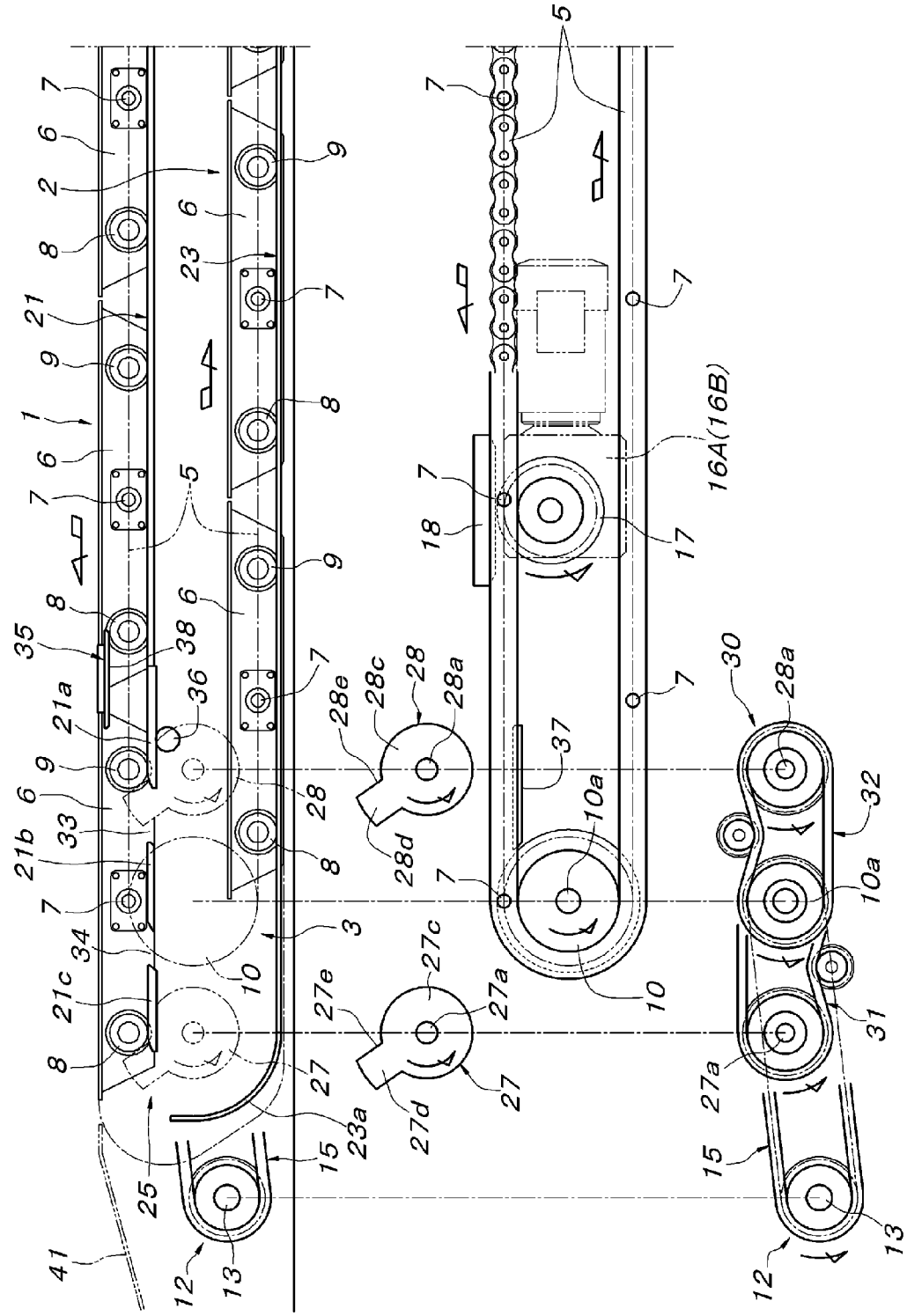
FIG. 4 is an exploded side view illustrating the conveyance path terminal end portion of the slat conveyor.

The pair of left and right driving endless turning bodies 5 are composed of endless roller chains stretched between pairs of left and right rotating wheels (sprocket wheels) 10, 11 pivotally supported on the U-turn path sections 3, 4 at both ends so as to be concentric with each other. The pair of left and right rotating wheels 10 of the rotating wheels 10, 11, which rotating wheels 10 located at the terminal end side of the conveyance path, are interlockingly coupled to each other via an interlocking means 12 going through the outside of the U-turn path section 3 at the terminal end side of the conveyance path, as illustrated in FIG. 2 and FIG. 4. This interlocking means 12 is constituted of a pair of left and right relay rotating shafts 13 supported concentrically with each other, a transmission shaft 14 interlockingly coupling the relay rotating shafts 13 together, and a pair of left and right chain transmission means 15 interlockingly coupling a pair of left and right rotating shafts 10a on which respective rotating wheels 10 are mounted and the pair of left and right relay rotating shafts 13.

As drive means to drive the pair of left and right driving endless turning bodies 5, speed reducer equipped motors 16A to 16D are provided that respectively drive the respective driving endless turning bodies 5 at a plurality of places, specifically, front and rear places in the length direction. Each of the speed reducer equipped motors 16A to 16D is such that a driving sprocket wheel 17 engaged with the upper outward path section of each driving endless turning body 5 from below is mounted on an output shaft of the speed reducer, as illustrated in FIGS. 2 to 5 and FIG. 9. A chain guide rail 18 preventing each driving endless turning body 5 from lifting upward from the driving sprocket wheel 17 is juxtaposed at a region of each driving endless turning body 5 with which the driving sprocket wheel 17 is engaged from below. This chain guide rail 18 abuts against rollers of the roller chain constituting the driving endless turning body 5 from above, and is mounted to a motor supporting frame 19 supporting each speed reducer equipped motor 16A to 16D. The motor supporting frame 19 is supported so as to be adjustable in height with respect to a base member 20.

The left and right both side faces of each slat body 6 are vertically swingably supported to the pair of left and right driving endless turning bodies 5 via the horizontal support shafts 7. Specifically, a small diameter shaft portion at the distal end of each horizontal support shaft 7 is inserted and locked instead of one of link coupling pins (roller shafts) of the roller chain constituting the driving endless turning body 5. In this manner, each slat body 6 is pivotally supported vertically and swingably between the pair of left and right driving endless turning bodies 5 at regular intervals in the length direction of the driving endless turning bodies 5.

Figure 8:
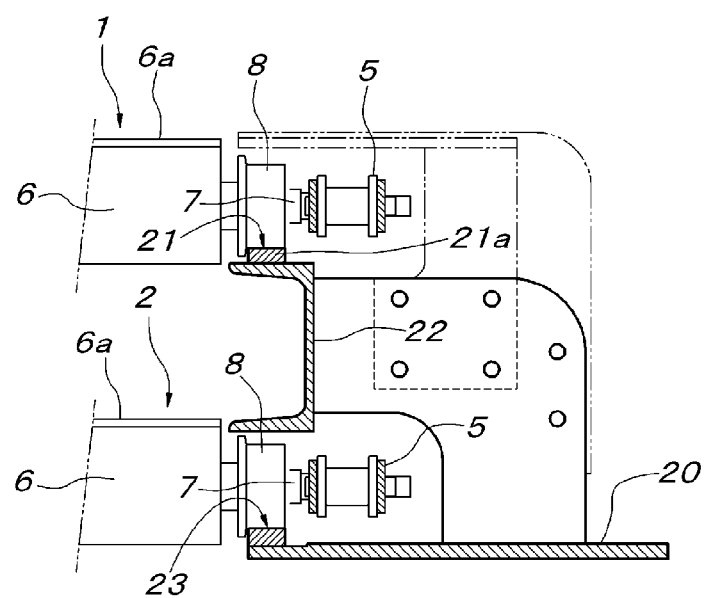
FIG. 8 is a longitudinal sectional front view illustrating a configuration of one side of upper and lower both horizontal path sections.
Figure 9:
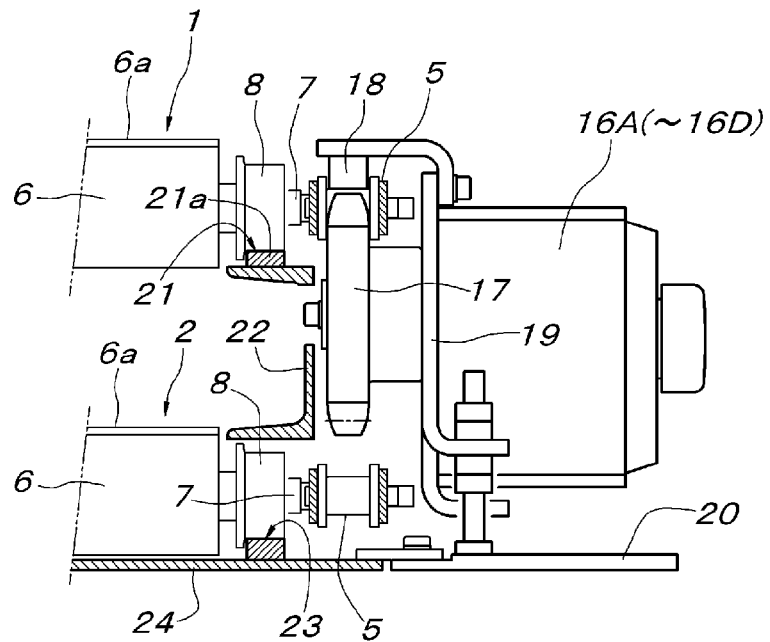
FIG. 9 is a longitudinal sectional front view illustrating one side of driving portions of a driving endless turning body.

On the upper horizontal outward path section 1, a pair of left and right upper guide rails 21 rollably supporting, from below, the pairs of front and rear guide rollers 8, 9 pivotally supported to the left and right both side faces of each slat body 6 are laid on a pair of left and right main frames 22 supported on the base frames 20 as illustrated in FIG. 8 in order to hold each slat body 6 moving on the upper horizontal outward path section 1 in the horizontal posture. On the lower horizontal inward path section 2, a pair of left and right lower guide rails 23 rollably supporting, from below, the pairs of front and rear guide rollers 8, 9 pivotally supported to the left and right both side faces of each slat body 6 are laid on the base frames 20, a coupling plate material 24 coupling the pair of left and right base members 20 to each other, etc., as illustrated in FIGS. 8 to 13 in order to hold each slat body 6 moving on the lower horizontal inward path section 2 in the horizontal posture. By this configuration, each slat body 6 can move maintaining the horizontal posture while a slight gap is formed between front and rear adjacent slat bodies 6, on the upper and lower both horizontal path sections 1, 2. The pair of front and rear guide rollers 8, 9 provided to each slat body 6 are positioned between the driving endless turning body 5 and the slat body 6 in a plan view in a state of being disposed in series in the moving direction of the slat body 6.

U-turn guiding means 25, 26 are juxtaposed on the U-turn path sections 3, 4 at both ends. The U-turn guiding means 25 of the U-turn path section 3 at the terminal end side of the conveyance path will be explained. There are provided a pair of front and rear slat body posture controlling rotating bodies 27, 28 pivotally supported at front and rear both sides of respective left and right paired rotating wheels 10 stretching the pair of left and right driving endless turning bodies 5 on the U-turn path section 3 and at positions overlapped with the moving paths of the pairs of front and rear guide rollers 8, 9 on the slat body 6 side in a plan view. These rotating bodies 27, 28 are pivotally supported on the base frames 20 via bearing frames 27b, 28b. The rotating shaft 10a of the rotating wheel 10 and the rotating shafts 27a, 28b to which the rotating bodies 27, 28 are fixed are at the same height in a side view and disposed front-rear symmetrically at intervals equal to intervals between the horizontal support shaft 7 and respective guide rollers 8, 9 on the slat body 6 side.

The above rotating bodies 27, 28 are each composed of a circular plate 27c, 28c having a circumferential surface along an inner edge of a U-turn movement track of each guide roller 8, 9 at the time when each slat body 6 U-turns parallelly maintaining the horizontal posture on the U-turn path section 3, and a protruding arm 27d, 28d protruded from the circular plate 27c, 28c in a radial direction. An internal corner portion between one side of the protruding arm 27d, 28d and the circumferential surface of the circular plate 27c, 28c is an engaging portion 27e, 28e positioning the guide roller 8, 9.

The pairs of front and rear slat body posture controlling rotating bodies 27, 28 are respectively driven by the drive means 30. As illustrated in FIG. 2 and FIG. 4, the drive means 30 are each constituted by chain transmission means 31, 32 interlockingly coupling the rotating shaft 10a of the rotating wheel 10 positioned in between both rotating bodies 27, 28 and the rotating shaft 27a, 28a of respective rotating bodies 27, 28 to each other. Each rotating body 27, 28 is interlocked with the rotating wheel 10 and rotationally driven at the same speed and in the same direction as the rotating wheel 10.

The pair of left and right upper guide rails 21 laid on the upper horizontal outward path section 1 are provided, at the end region on the U-turn path section 3 side thereof, with first notched portions 33 allowing passage of the rear guide rollers 9 crossing the upper guide rails 21 downward from above and making U-turn movements and second notched portions 34 allowing passage of the horizontal support shafts 7 crossing the upper guide rails 21 downward from above and making U-turn movements. These respective notched portions 33, 34 divide the upper guide rails 21 into guide rail main bodies 21a whose free ends are positioned in the vicinity immediately above the inner rotating bodies 28, short guide rail portions 21b at positions overlapped with the rotating wheels 10, and short guide rail portions 21c at positions overlapped with the outer rotating bodies 27 in a side view.

Figure 11:
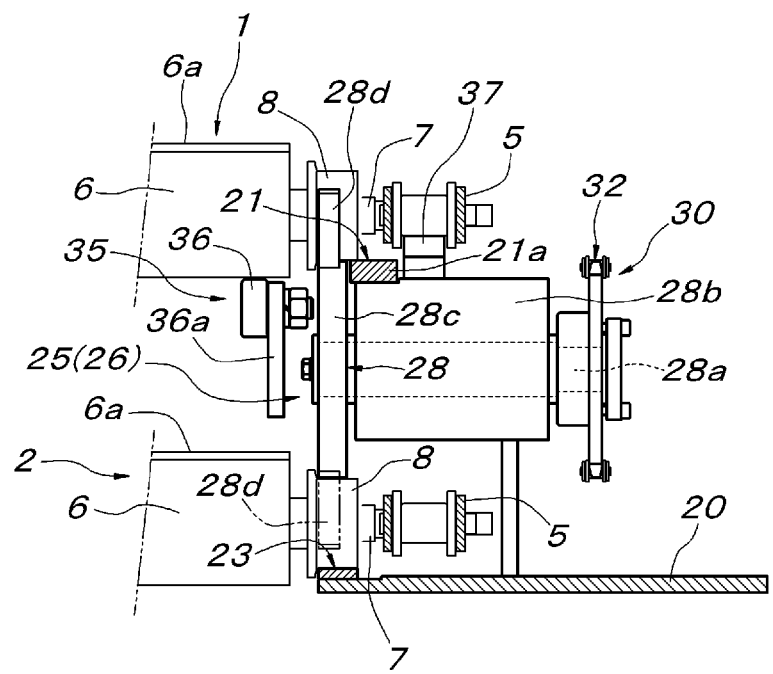
FIG. 11 is a longitudinal sectional front view illustrating an inner rotating body of one side of pairs of front and rear slat body posture controlling rotating bodies of the U-turn guiding means.
Figure 12:
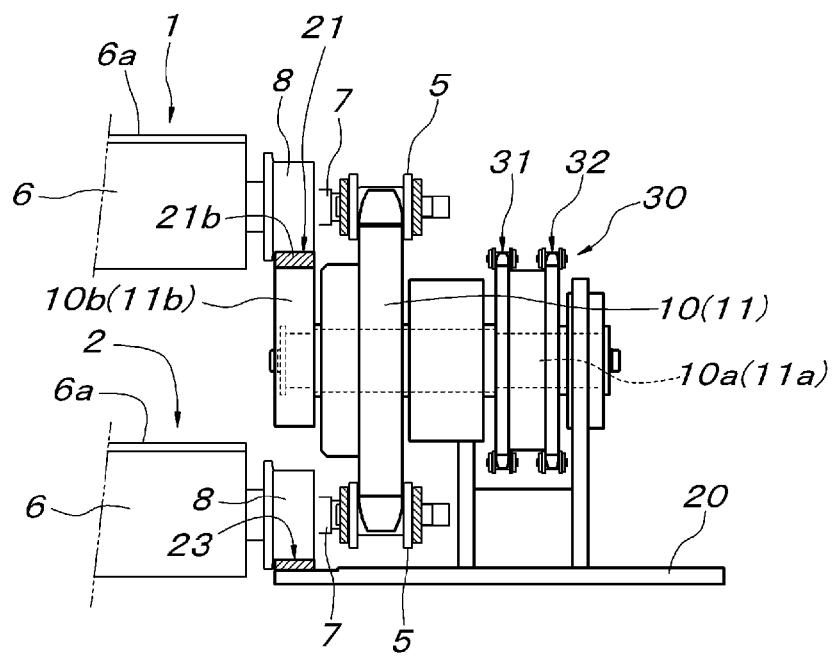
FIG. 12 is a longitudinal sectional front view illustrating one side of rotating wheels of the driving endless turning body.
Figure 13:
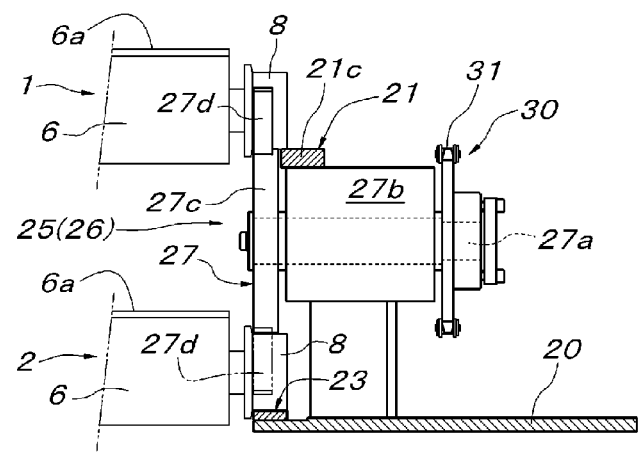
FIG. 13 is a longitudinal sectional front view illustrating an outer rotating body of one side of the pairs of front and rear slat body posture controlling rotating bodies of the U-turn guiding means.

As illustrated in FIG. 11 and FIG. 13, the protruding arms 27d, 28d of the rotating bodies 27, 28 have a thin thickness so as to be engaged with parts close to inner sides of the respective guide rollers 8, 9. A terminal end portion of the guide rail main body 21a and the short guide rail portion 21c can support and guide parts close to outer sides of the respective guide rollers 8, 9 protruding outside from turning tracks of the protruding arms 27d, 28d. As illustrated in FIG. 11, the terminal end portion of the guide rail main body 21a is supported on a bearing frame 28b pivotally supporting the rotating body 28. Also, as illustrated in FIG. 12, the short guide rail portion 21b is supported on an inner bearing frame 10b supporting an inner end portion of the rotating shaft 10a of the rotating wheel 10. As illustrated in FIG. 13, the short guide rail portion 21c is supported on a bearing frame 27b pivotally supporting the rotating body 27.

Figure 10:
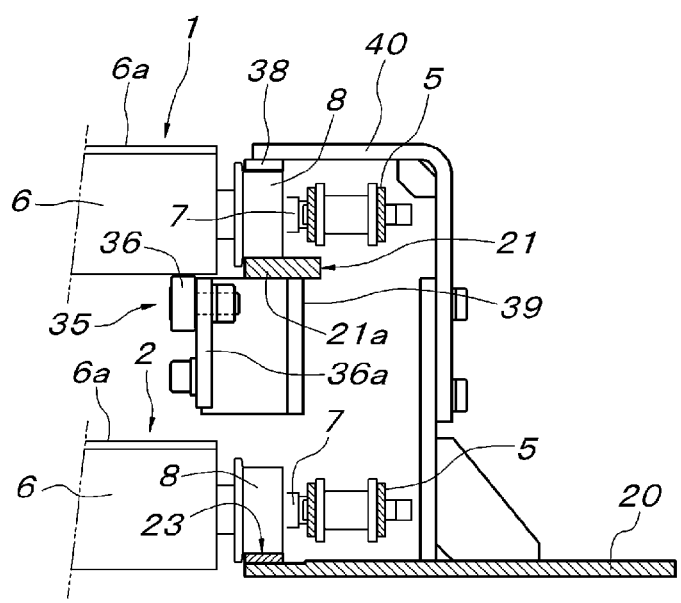
FIG. 10 is a longitudinal sectional front view illustrating one side of supporting rollers for supporting a bottom surface of a slat body, of the U-turn guiding means.
Figure 15:
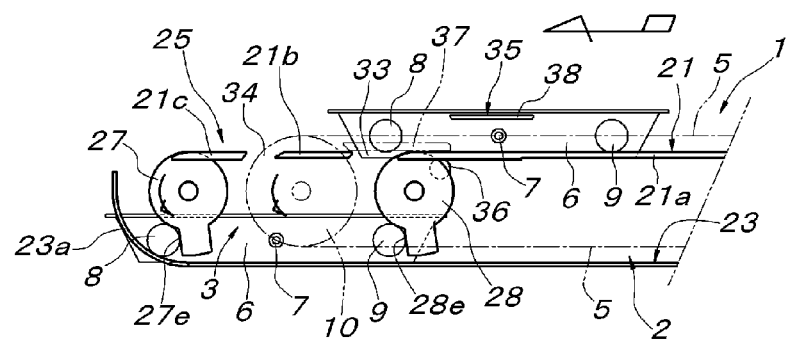
FIG. 15 is a side view in one of the U-turn path sections illustrating a state at the time when the rotations of the slat body posture controlling rotating bodies advance slightly from the state illustrated in FIG. 14.
Figure 17:
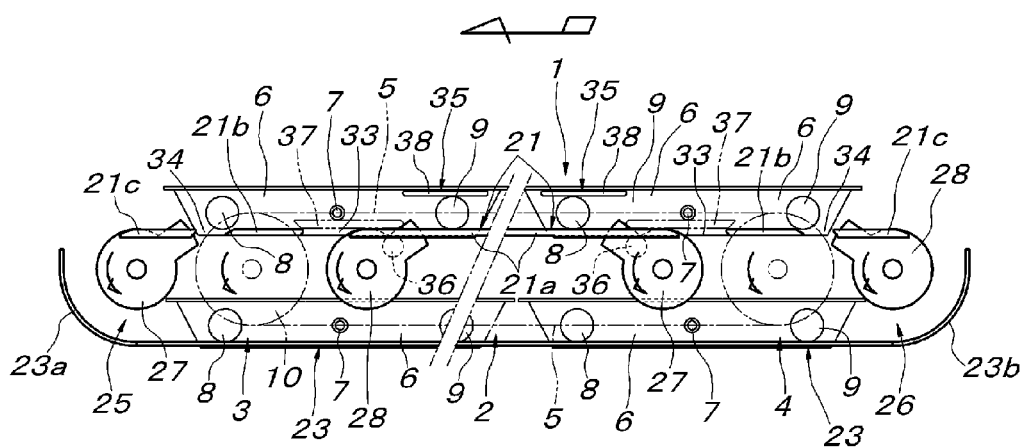
FIG. 17 is a side view in the U-turn path sections at both ends illustrating a state at the time when the rotations of the slat body posture controlling rotating bodies advance by 90 degrees from the state illustrated in FIG. 16.

Further, the U-turn guiding means 25 is juxtaposed with an auxiliary guiding means 35. This auxiliary guiding means 35 is constituted of a pair of left and right supporting rollers 36 provided so as to support a bottom surface of the slat body 6 inside the rotating bodies 28, chain guide rails 37 supporting the upper outward path sections of the driving endless turning bodies 5 at fixed regions close to the rotating wheels 10, and hold-down rails 38 preventing lifting of the rear guide rollers 9. As illustrated in FIG. 15, the supporting roller 36 prevents the front guide roller 8 of the slat body 6 from falling into the first notched portion 33 of the upper guide rail 21 by gravity when the guide roller 8 horizontally passes through and moves on the first notched portion 33, by supporting the slat body 6 itself. As illustrated in FIG. 17, the chain guide rail 37 prevents the front guide roller 8 of the slat body 6 from falling into the second notched portion 34 of the upper guide rail 21 by gravity when the guide roller 8 horizontally passes through and moves on the second notched portion 34, by receiving from below a fixed region of the driving endless turning body 5 at which the horizontal support shaft 7 is located at that time. As a result, tilting of the slat body 6 about the horizontal support shaft 7 toward the lifting direction of the rear guide roller 9 is prevented by the hold-down rail 38. As illustrated in FIG. 10, the supporting roller 36 is supported to a support frame 39 supporting the terminal end portion of the guide rail main body 21a via a bearing plate 36a. As illustrated in FIG. 11, the chain guide rail 37 is supported on the bearing frame 28b pivotally supporting the inner rotating body 28. As illustrated in FIG. 10, the hold-down rail 38 is supported below a distal end of a cantilevered support frame 40 supported on the base member 20 and striding over the driving endless turning body 5.

Figure 3:
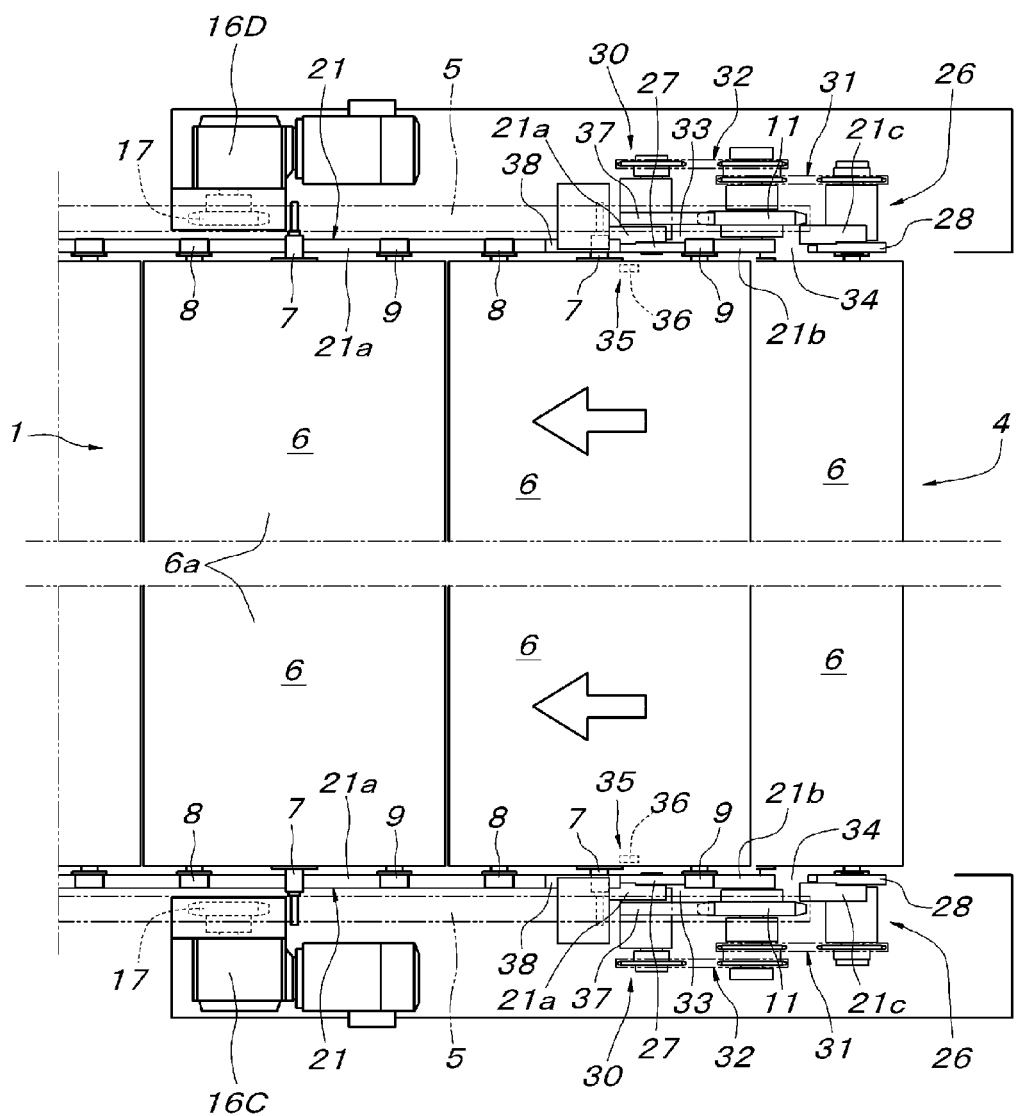
FIG. 3 is a partially omitted plan view illustrating a conveyance path beginning end portion of the slat conveyor.
Figure 5:
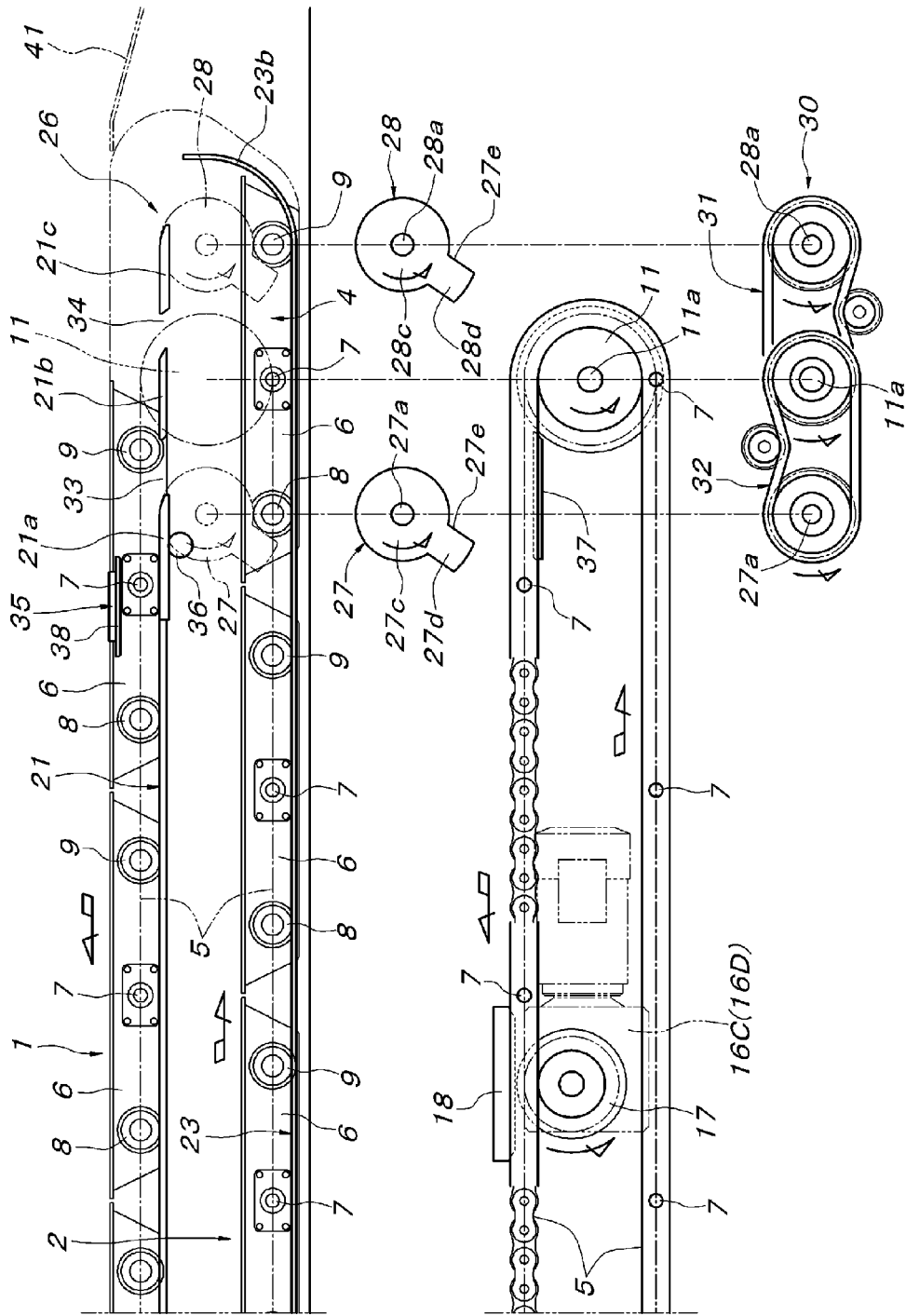
FIG. 5 is an exploded side view illustrating the conveyance path beginning end portion of the slat conveyor.
Figure 6:
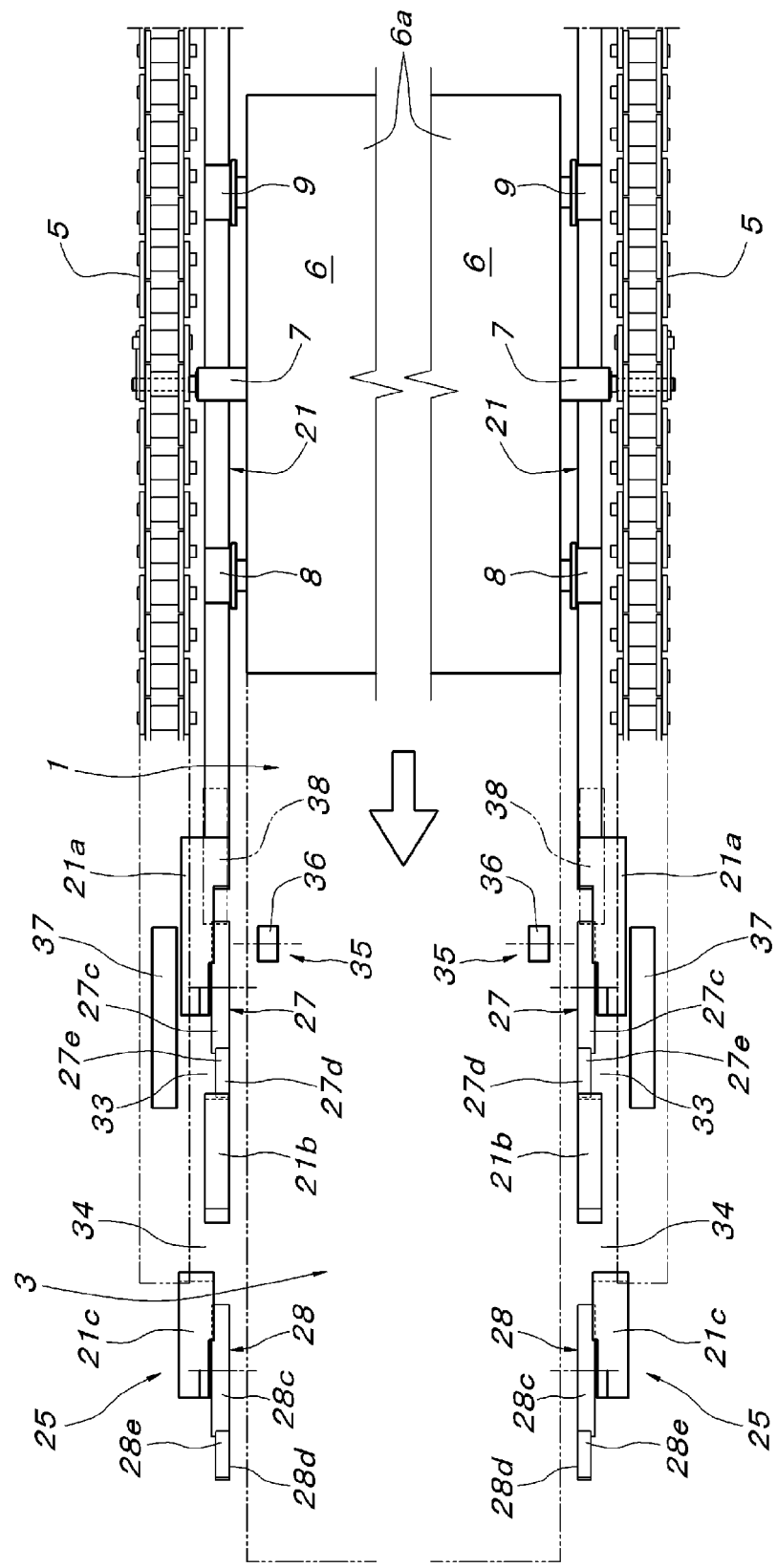
FIG. 6 is a plan view illustrating a U-turn guiding means at the conveyance path terminal end portion of the slat conveyor.
Figure 7:
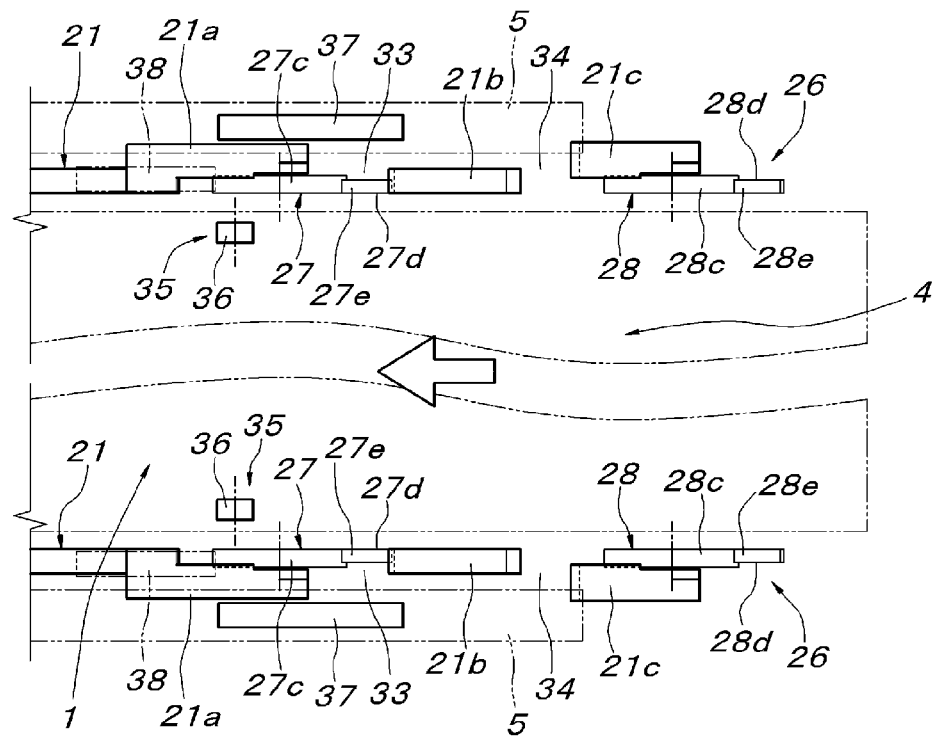
FIG. 7 is a plan view illustrating a U-turn guiding means at the conveyance path beginning end portion of the slat conveyor.

The U-turn guiding means 26 of the U-turn path section 4 at the beginning end side of the conveyance path has a structure symmetrical with the U-turn guiding means 25 of the U-turn path section 3 at the terminal end side of the conveyance path, as illustrated in FIG. 3, FIG. 5, and FIG. 7. Thus, the same reference symbols are given and only different points will be described. That is, the engaging portions 27e, 28e of the pair of front and rear rotating bodies 27, 28 in the U-turn guiding means 25 of the U-turn path section 3 are formed at the rear internal corner portions with respect to the rotational direction of the protruding arms 27d, 28d, whereas engaging portions 27e, 28e of a pair of front and rear rotating bodies 27, 28 in the U-turn guiding means 26 of the U-turn path section 4 are formed at front internal corner portions with respect to the rotational direction of the protruding arms 27d, 28d. In the U-turn guiding means 25 of the U-turn path section 3, the pairs of front and rear guide rollers 8, 9 of the slat body 6 U-turning downward from above are received by the engaging portions 27e, 28e of the pairs of front and rear rotating bodies 27, 28 to control the descending speed, whereby the slat body 6 is made to U-turn parallelly downward from above. On the other hand, in the U-turn guiding means 26 of the U-turn path section 4, the pairs of front and rear guide rollers 8, 9 of the slat body 6 U-turning upward from below are pushed up by the engaging portions 27e, 28e of the pairs of front and rear rotating bodies 27, 28, whereby the slat body 6 is made to U-turn parallelly upward from below.

In the U-turn guiding means 26 of the U-turn path section 4, the front guide rollers 8 pass through the first notched portions 33 of the upper guide rails 21 upward from below, and the horizontal support shafts 7 pass through the second notched portions 34 upward from below. Furthermore, chain guide rails 37 and hold-down rails 38 of an auxiliary guiding means 35 provided to this U-turn guiding means 26 prevent tilting of the slat body 6 when the rear guide rollers 9 horizontally pass through and move on the second notched portions 34. Supporting rollers 36 prevent tilting of the slat body 6 when the rear guide rollers 9 horizontally pass through and move on the first notched portions 33. Chain transmission means 31, 32 of a drive means 30 for the pair of front and rear rotating bodies 27, 28 in the U-turn guiding means 26 interlockingly couple a rotating shaft 11*a* of a rotating wheel 11 on the U-turn path section 4 and the rotating shafts 27*a*, 28*a* of the pair of front and rear rotating bodies 27, 28.

Operation of the slat conveyor configured as above will be described. The speed reducer equipped motors 16A to 16D are operated to turn the pair of left and right driving endless turning bodies 5 in the same direction by respective driving sprocket wheels 17, wherewith each slat body 6 can be turned on the horizontal circulation path composed of the upper horizontal outward path section 1, the lower horizontal inward path section 2, and the U-turn path sections 3, 4 at both ends. At this time, each slat body 6 moving on the upper horizontal outward path section 1 and the lower horizontal inward path section 2 moves maintaining the horizontal posture since the pairs of front and rear guide rollers 8, 9 on the left and right both side faces of the slat body 6 are supported and roll on the pair of left and right upper guide rails 21 and the pair of left and right lower guide rails 23. The pair of left and right driving endless turning bodies (roller chains) 5 are engaged with the pair of left and right rotating wheels (sprocket wheels) 10 interlockingly coupled to each other by the interlocking means 12 and are stretched, and thus, mechanically synchronized and turned. The pair of left and right driving endless turning bodies 5 are configured to be driven respectively by two speed reducer equipped motors 16A, 16C and 16B, 16D, respectively. This configuration is suitable under circumstances where high-powered large speed reducer equipped motors cannot be used as in a case where a slat conveyor having a low floor structure is realized without digging a pit under the floor as illustrated. However, the configuration of the drive means for the pair of left and right driving endless turning bodies 5 in the slat conveyor of the present invention should not be limited to the illustrated configuration.

Figure 14:
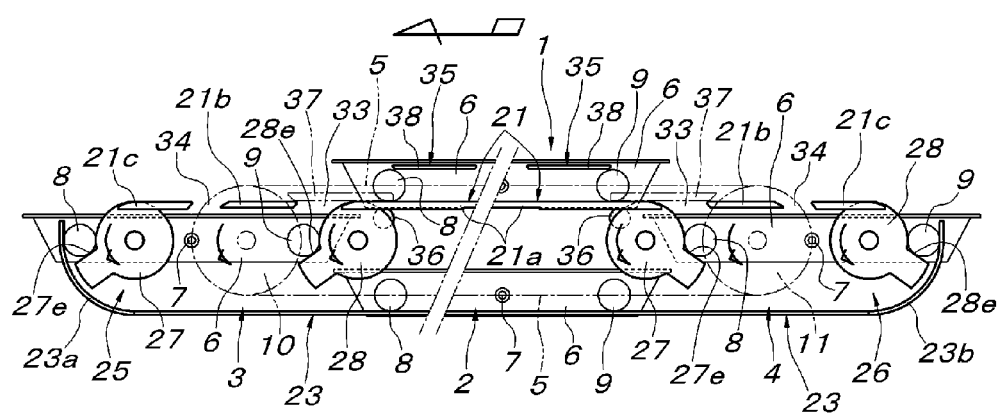
FIG. 14 is a side view in U-turn path sections at both ends illustrating a state at the time when rotations of the slat body posture controlling rotating bodies advance by 90 degrees from the state illustrated in FIG. 1.

Each slat body 6 is turned on the horizontal circulation path by the drive of the pair of left and right driving endless turning bodies 5 as described above. Here, the process in which one slat body 6 moving on the upper horizontal outward path section 1 reaches the U-turn path section 3 at the terminal end side in the conveyance direction will be verified. When the slat body 6 on the upper horizontal outward path section 1 reaches the U-turn path section 3 as illustrated in FIG. 14, the front guide rollers 8 move on the first notched portions 33 of the upper guide rails 21 as illustrated in FIG. 15. At this time, the pair of left and right supporting rollers 36 of the auxiliary guiding means 35 are in the state of supporting the left and right both side faces of the bottom surface of the slat body 6 as illustrated, and thus, the front guide rollers 8 can horizontally pass and move without falling into the first notched portions 33.

Figure 16:
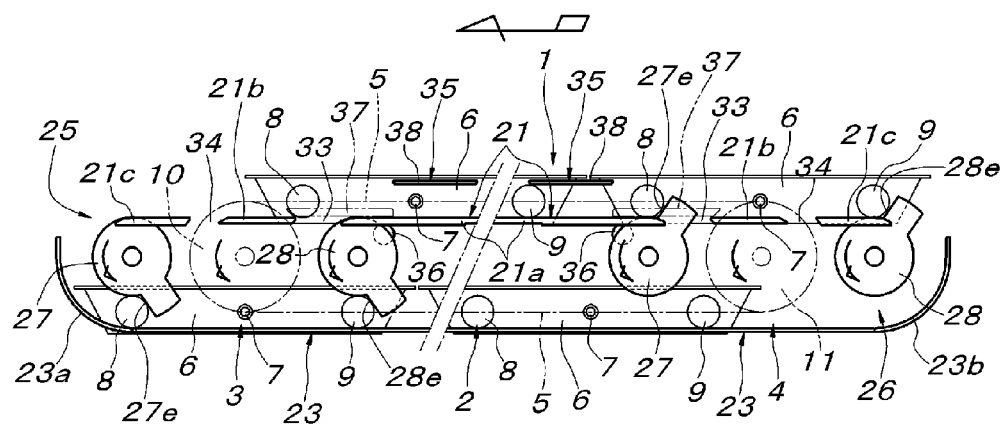
FIG. 16 is a side view in the U-turn path sections at both ends illustrating a state at the time when the rotations of the slat body posture controlling rotating bodies advance by 90 degrees from the state illustrated in FIG. 14.

The slat body 6 in which the front guide rollers 8 have passed through and moved on the first notched portions 33 of the upper guide rails 21 in the above manner is transferred onto the short guide rail portions 21*b* downstream of the first notched portions 33 as illustrated in FIG. 16, and subsequently, the front guide rollers 8 move on the second notched portions 34 of the upper guide rails 21 as illustrated in FIG. 17. At this time, the pair of left and right chain guide rails 37 of the auxiliary guiding means 35 receive the regions of the driving endless turning bodies 5 to which the horizontal support shafts 7 of the slat body 6 are coupled and the hold-down rails 38 of the auxiliary guiding means 35 are in the state of hanging over the rear guide rollers 9 as illustrated. Consequently, phenomena caused by the front guide rollers 8 falling into the second notched portions 34, that is, the tilting of the slat body 6 about the rear guide rollers 9 with the front lowered and the tilting of the rear guide rollers 9 about the horizontal support shafts 7 just like lifting up are prevented. Thus, the front guide rollers 8 can horizontally pass and move without falling into the second notched portions 34 and be transferred onto the downstream short guide rail portions 21*c*. At this time, the pairs of front and rear rotating bodies 27, 28 of the U-turn guiding means 25 are in the state immediately before the protruding arms 27*d*, 28*d* thereof stand up at positions immediately in front of the pairs of front and rear guide rollers 8, 9 of the slat body 6 as illustrated in FIG. 17.

The slat body 6 on the upper horizontal outward path section 1 is brought into the state illustrated in FIG. 1 in the above manner, that is, the front guide rollers 8 reach the terminal ends of the upper guide rails 21 (outer ends of the short guide rail portions 21*c*) and simultaneously the rear guide rollers 9 reach immediately in front of the first notched portions 33 of the upper guide rails 21. After that, the slat body 6 starts to descend the U-turn path section 3 with the circular downward movement of the horizontal support shafts 7 around the rotating wheels 10 stretching the driving endless turning bodies 5. At this time, the protruding arms 27*d*, 28*d* of the pairs of front and rear rotating bodies 27, 28 are at the positions immediately in front of the pairs of front and rear guide rollers 8, 9 of the slat body 6 and the pairs of front and rear rotating bodies 27, 28 are interlockingly rotated by the drive means 30 at the same speed and in the same direction as the rotating wheels 10. Thus, the pairs of front and rear guide rollers 8, 9 going to descend downward from the terminal ends of the upper guide rails 21 and the first notched portions 33 are engaged with and received by the engaging portions 27*e*, 28*e* constructed by the internal corner portions on the rear side in the rotational direction of the protruding arms 27*d*, 28*d* of the pairs of front and rear rotating bodies 27, 28, and three points of the horizontal support shafts 7 on the slat body 6 side and the pairs of front and rear guide rollers 8, 9 descend circular descent paths having the same radius at the same speed. As a result, the slat body 6 U-turns parallelly maintaining the horizontal posture and moves on to the lower horizontal inward path section 2.

It is preferable that semi-circular guide rail portions 23*a* concentric with the rotating bodies 27 are provided consecutively at the beginning end sides of the lower guide rails 23, which guide rail portions 23*a* forcibly guiding the front guide rollers 8 received by the engaging portions 27*e* of the rotating bodies 27 and descending, to positions immediately below the rotating bodies 27 when the slat body 6 on the upper horizontal outward path section 1 U-turns parallelly maintaining the horizontal posture and moves on to the lower horizontal inward path section 2 in the above manner.

When one slat body 6 reaches the terminal end in the conveyance direction of the upper horizontal outward path section 1, one slat body 6 moving on the lower horizontal inward path section 2 is configured to reach the terminal end of the lower horizontal inward path section 2 and the protruding arms 27*d*, 28*d* of the pairs of front and rear rotating bodies 27, 28 in the U-turn guiding means 26 on the U-turn path section 4 side are configured to be located at positions immediately after the pairs of front and rear guide rollers 8, 9 of the slat body 6, as illustrated in FIG. 1. Since the pairs of front and rear rotating bodies 27, 28 in the U-turn guiding means 26 are also interlockingly rotated by the drive means 30 at the same speed and in the same direction as the rotating wheels 11, the pairs of front and rear guide rollers 8, 9 of the slat body 6 are also engaged with the engaging portions 27e, 28e constructed by the internal corner portions on the rotating direction side of the protruding arms 27d, 28d of the pairs of front and rear rotating bodies 27, 28 when the horizontal support shafts 7 of the slat body 6 having reached the terminal end of the lower horizontal inward path section 2 are pulled upward with the turning of the pair of left and right driving endless turning bodies 5 about the rotating wheels 11, and three points of the horizontal support shafts 7 on the slat body 6 side and the pairs of front and rear guide rollers 8, 9 ascend circular ascent paths having the same radius at the same speed. As a result, the slat body 6 at the terminal end of the lower horizontal inward path section 2 also U-turns parallelly maintaining the horizontal posture and moves on to the upper horizontal outward path section 1.

When the slat body 6 at the terminal end of the lower horizontal inward path section 2 is entering the beginning end position of the upper horizontal outward path section 1 from the U-turn path section 4 in the above manner, the guide rollers 9 which become the rear side on the upper horizontal outward path section 1 are transferred from the beginning end positions of the upper guide rails 21 (outer end positions of the short guide rail portions 21c on the U-turn path section 4 side) onto the upper guide rails 21 and also the guide rollers 8 which become the front side on the upper horizontal outward path section 1 are transferred onto the upper guide rails 21 (onto the guide rail main bodies 21a) via the first notched portions 33 on the U-turn path section 4 side of the upper guide rails 21, and the horizontal support shafts 7 move on to the upper side of the upper guide rails 21 via the second notched portions 34 on the U-turn path section 4 side of the upper guide rails 21, as illustrated in FIG. 14 and FIG. 16.

When the slat body 6 having started its forward movement from the beginning end position on the U-turn path section 4 side in the upper horizontal outward path section 1 has its rear guide rollers 9 passing through on the second notched portions 34 on the U-turn path section 4 side of the upper guide rails 21 as illustrated in FIG. 17, the pair of left and right chain guide rails 37 and the hold-down rails 38 of the auxiliary guiding means 35 provided to the U-turn guiding means 26 on the U-turn path section 4 side operate in the same manner as the pair of left and right chain guide rails 37 and the hold-down rails 38 of the auxiliary guiding means 35 provided to the U-turn guiding means 25 on the U-turn path section 3 side as already described, and the rear guide rollers 9 can horizontally pass and move without falling into the second notched portions 34 and be transferred onto the downstream short guide rail portions 21b. When the rear guide rollers 9 pass through on the first notched portions 33 on the U-turn path section 4 side of the upper guide rails 21, the pair of left and right supporting rollers 36 of the auxiliary guiding means 35 provided to the U-turn guiding means 26 on the U-turn path section 4 side operate in the same manner as the pair of left and right supporting rollers 36 of the auxiliary guiding means 35 provided to the U-turn guiding means 25 on the U-turn path section 3 side as already described, and the rear guide rollers 9 can pass and move without falling into the first notched portions 33 and be transferred onto the downstream guide rail main bodies 21a.

It is preferable that semi-circular guide rail portions 23b concentric with the rotating bodies 28 are provided consecutively at the terminal end sides of the lower guide rails 23, which guide rail portions 23b forcibly guiding the rear guide rollers 9 pushed up by the engaging portions 28e of the rotating bodies 28 and ascending, to upper ends of lower half regions of the rotating bodies 28 when the slat body 6 at the terminal end of the lower horizontal inward path section 2 U-turns parallelly maintaining the horizontal posture and moves on to the upper horizontal outward path section 1 in the above manner.

As obvious from the foregoing descriptions, respective slat bodies 6 move on the both upper and lower horizontal path sections 1, 2 maintaining the horizontal postures in the continuous state, while U-turning parallelly maintaining the horizontal postures on the U-turn path sections 3, 4 at both ends. Thus, objects can be loaded and conveyed on the slat bodies 6 in the continuous state on the upper horizontal outward path section 1. At this time, a loading/unloading guide plate 41 having such an inclination angle that can absorb a step with the floor surface and make the automobiles travel safely can be juxtaposed to the beginning end side and the terminal end side of the upper horizontal outward path section 1 as illustrated by virtual lines in FIG. 1, for example, in the case where self-propelled automobiles are the objects.

The slat conveyor according to the embodiment of the present invention as presented above can be utilized as a low-floor structured slat conveyor having the significantly low ground height, as illustrated. Another feature is that the U-turn guiding means 25, 26 disposed on the U-turn path sections 3, 4 at both ends for making the slat body 6 U-turn parallelly maintaining the horizontal posture have a symmetrical structure and accordingly the slat body 6 can be made to U-turn parallelly maintaining the horizontal posture on the U-turn path sections 3, 4 at both ends without problems even if the turning direction of the slat body 6 is reversed. However, a slat conveyor not required to convey the objects in the opposite direction on the upper horizontal outward path section 1 can be configured as follows.

That is, as illustrated in FIG. 18, one auxiliary guide rollers 8 of the pairs of front and rear guide rollers pivotally supported on the left and right both side faces of the slat body 6 are rotatably supported to the horizontal support shafts 7 for pivotally supporting vertically and swingably the slat body 6 to the driving endless turning bodies 5, and the other main guide rollers 9 are pivotally supported directly to the slat body 6. On the upper horizontal outward path section 1 and the lower horizontal inward path section 2, guide rails 21, 23 are laid that support the slat body 6 so as to be movable in the horizontal posture, via the main and auxiliary both guide rollers 8, 9 pivotally supported on the left and right both side faces of the slat body 6. One end portions of both end portions of the upper guide rails 21, which end portions on a side where the auxiliary guide rollers 8 (the horizontal support shafts 7) precede the main guide rollers 9, are provided with first notched portions 42 for crossing the main guide rollers 9 with the upper guide rails 21 and passing the main guide rollers 9 therethrough. The other end portions of the upper guide rails 21 are provided with second notched portions 43 for crossing the auxiliary guide rollers 8 (the horizontal support shafts 7) with the upper guide rails 21 and passing the auxiliary guide rollers 8 therethrough.

On the U-turn path section 3 where the first notched portions 42 are located, the rotating bodies 28 of the previous embodiment and U-turn guiding means 44 provided with chain guide rails 37 serving as the auxiliary guiding means 35 are provided. On the opposite U-turn path section 4, the rotating bodies 27 of the previous embodiment and U-turn guiding means 45 provided with supporting rollers 36 serving as the auxiliary guiding means 35 are provided. The rotating bodies 28 of the U-turn guiding means 44 only need to be interlockingly coupled via the chain transmission means 32 to the rotating wheels 10 stretching the pair of left and right driving endless turning bodies 5 in the same manner as the previous embodiment. The respective rotating bodies 27 of the U-turn guiding means 45 only need to be interlockingly coupled via the chain transmission means 31 to the rotating wheels 11 stretching the pair of left and right driving endless turning bodies 5 in the same manner as the previous embodiment.

In the above configuration, the pair of left and right driving endless turning bodies 5 are rotationally driven in a normal rotational direction in which each slat body 6 on the upper horizontal outward path section 1 moves toward a side where the U-turn path section 3 is located. As a result, on the U-turn path section 3 side, the slat body 6 can be made to U-turn parallelly while supported in the horizontal posture and can be moved on to the lower horizontal inward path section 2 by the horizontal support shafts 7 descending the semi-circular U-turn paths by means of the pair of left and right driving endless turning bodies 5 and the main guide rollers 9 supported by the engaging portions 28e of the rotating bodies 28 and descending the semi-circular U-turn paths via the first notched portions 42 in the same direction and at the same speed as the horizontal support shafts 7. On the U-turn path section 4 side, the slat body 6 can be made to U-turn parallelly while supported in the horizontal posture and can be moved on to the upper horizontal outward path section 1 by the horizontal support shafts 7 ascending the semi-circular U-turn paths via the second notched portions 43 by means of the pair of left and right driving endless turning bodies 5 and the main guide rollers 9 supported by the engaging portions 28e of the rotating bodies 28 and ascending the semi-circular U-turn paths in the same direction and at the same speed as the horizontal support shafts 7.

As a matter of course, falling of the auxiliary guide rollers 8 (the horizontal support shafts 7) into the first notched portions 42 can be prevented by the chain guide rails 37 of the auxiliary guiding means 35 provided to the U-turn guiding means 44 on the U-turn path section 3, and falling of the main guide rollers 9 into the second notched portions 43 can be prevented by the pair of left and right supporting rollers 36 of the auxiliary guiding means 35 provided to the U-turn guiding means 45 on the U-turn path section 4, in the same manner as the previous embodiment.

The slat conveyor of the present invention can be utilized as a low-floor structured slat conveyor having the significantly low ground height.

What is claimed is:

1. A slat conveyor comprising:
    left and right driving endless turning bodies turning along a circulation path having an upper horizontal outward path section on which upper guide rails are laid, a lower horizontal inward path section on which lower guide rails are laid, and U-turn path sections at both ends;
    a plurality of slat bodies circularly turning on the circulation path with load supporting surfaces facing up;
    each slat body having left and right side faces respectively pivotally supported vertically and swingably to the driving endless turning bodies via mutually concentric horizontal support shafts;
    each left and right side faces of each slat body having two guide rollers in a back and forth direction pivotally supported in a front-rear symmetric position with respect to the horizontal support shaft and also between the driving endless turning bodies and the slat body in a plan view;
    the upper guide rails and the lower guide rails being operable to hold each slat body moving on the upper horizontal outward path section and the lower horizontal inward path section, respectively, in a horizontal posture via the guide rollers;
    the U-turn path sections each having a U-turn guiding device for making the each slat body U-turn in a parallel manner while maintaining the slat body in the horizontal posture;
    each U-turn guiding device having two slat body posture controlling rotating bodies in a back and forth direction and having a drive device for driving the rotating bodies;
    the two rotating bodies being shifted in front and rear directions with respect to a rotating wheel for driving the endless turning bodies in an associated U-turn path section, and the two rotating bodies being pivotally supported and spaced to correspond to the spacing of the two guide rollers in the back and forth direction, respectively;
    each rotating body having an engaging portion on its outer circumference, the engaging portion having the same turning radius as that of the horizontal support shaft on the U-turn path sections and positioning and turning the guide roller, and the drive device drives each rotating body such that the engaging portion turns in the same direction and at the same speed as a turning direction and turning speed of the horizontal support shaft on the U-turn path sections;
    the upper guide rails being disposed below the guide rollers so as to rollably receive the guide rollers;
    the upper guide rails having end regions and each end region having a first notched portion for allowing vertical passage of one of the front and rear two guide rollers crossing the upper guide rails and making a U-turn movement, and a second notched portion for allowing vertical passage of the horizontal support shaft crossing the upper guide rails and making a U-turn movement;
    an auxiliary guiding device operable to prevent falling of the other one of the front and rear two guide rollers into the first notched portion and the second notched portion;
    the auxiliary guiding device including a supporting roller operable to support a bottom surface of the slat body inside the rotating body located on the inner side of the two front and rear rotating bodies along the circulation path, and a supporting rail operable to support the driving endless turning body and the horizontal support shaft coupled thereto, and a hold-down rail operable to prevent the other guide roller from lifting with the horizontal support shaft supported by the supporting rail as a supporting point.

2. The slat conveyor according to claim 1, wherein each rotating body comprises a circular plate having a circumferential surface along an inner edge of a U-turn movement track of one of the guide rollers, and a protruding arm protruded from the circular plate in a radial direction, and an internal corner portion between one side of the protruding arm and the circumferential surface of the circular plate constitutes the engaging portion for positioning the guide roller.

3. A slat conveyor comprising:
left and right driving endless turning bodies turning along a circulation path having an upper horizontal outward path section on which upper guide rails are laid, a lower horizontal inward path section on which lower guide rails are laid, and U-turn path sections at both ends;
a plurality of slat bodies circularly turning on the circulation path with load supporting surfaces facing up;
each slat body having left and right side faces respectively pivotally supported vertically and swingably to the driving endless turning bodies via mutually concentric horizontal support shafts;
each left and right side face of each slat body having a main guide roller pivotally supported at a position away to either the front or rear side of the horizontal support shaft and located between the driving endless turning bodies and the slat body in a plan view;
an auxiliary guide roller pivotally supported concentrically with the horizontal support shaft;
the guide rails holding the slat body in a horizontal posture via the main guide roller and the auxiliary guide roller on the upper horizontal outward path section and the lower horizontal inward path section;
the U-turn path sections at both ends respectively provided with a U-turn guiding device for making each slat body U-turn in a parallel manner while being maintained in the horizontal posture;
each U-turn guiding device including rotating bodies for controlling the posture of each slat body in the U-turn path sections and a drive device driving the rotating body;
the rotating body having an engaging portion on its outer circumference, the engaging portion having the same turning radius as that of the horizontal support shaft on the U-turn path sections and positioning and turning the main guide roller;
the drive device driving the rotating body such that the engaging portion turns in the same direction and at the same speed as a turning direction and turning speed of the horizontal support shaft on the U-turn path sections;
the upper guide rails are disposed below the main and auxiliary guide rollers so as to rollably receive the main and auxiliary guide rollers;
the upper guide rails having end regions and each end region having a notched portion for allowing an inner guide roller to cross the guide rails and make a U-turn movement, which inner guide roller is one of the main and auxiliary guide rollers and is located inwardly along the circulation path with respect to an outer guide roller of the main and auxiliary guide rollers;
an auxiliary guiding device operable to prevent falling of the outer guide roller passing through and moving on the notched portion; and
the auxiliary guiding device including a supporting roller pivotally supported at a fixed position so as to receive a bottom surface of the slat body and a supporting rail operable to support the driving endless turning body and the horizontal support shaft coupled thereto.

4. The slat conveyor according to claim 3, wherein each rotating body comprises a circular plate having a circumferential surface along an inner edge of a U-turn movement track of one of the guide rollers, and a protruding arm protruded from the circular plate in a radial direction, and an internal corner portion between one side of the protruding arm and the circumferential surface of the circular plate constitutes the engaging portion for positioning the guide roller.

* * * * *